Patented July 7, 1936

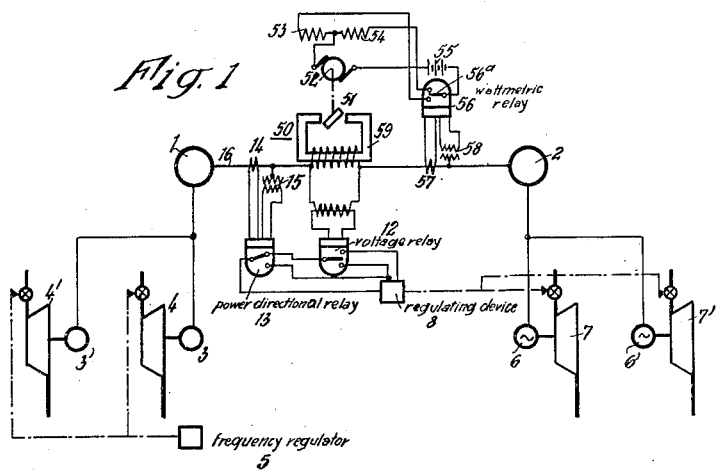

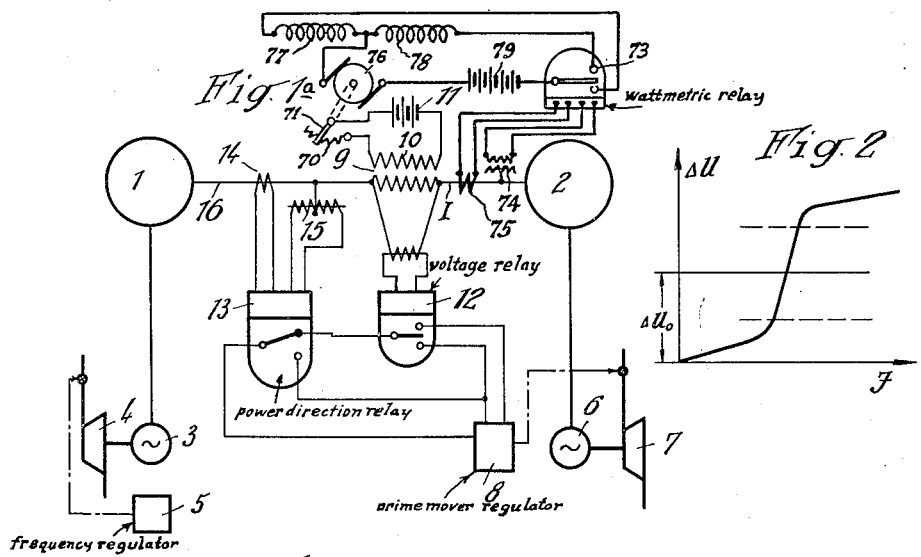
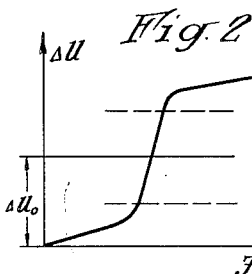
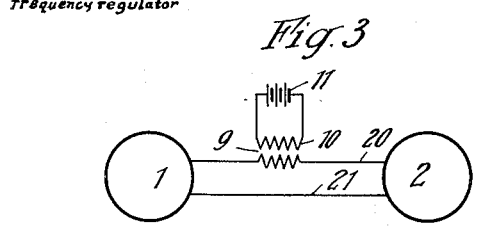
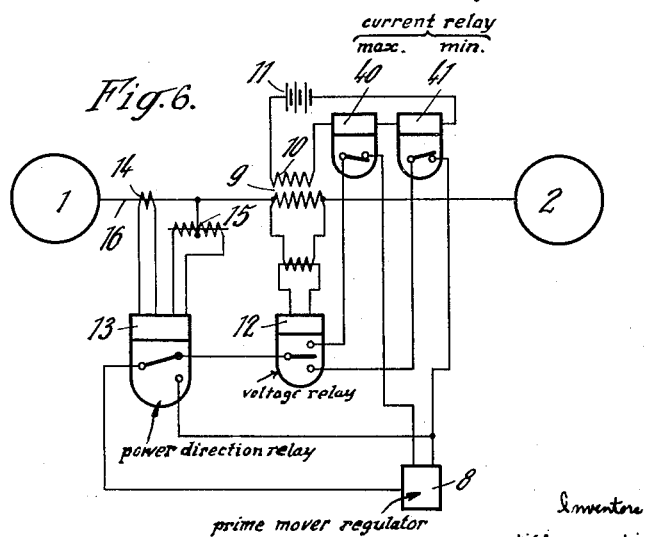

2,046,496

UNITED STATES PATENT OFFICE 2,046,496

ARRANGEMENT FOR MAINTAINING CONSTANT LINE POWER TRANSMISSION

Wilhelm Wiskott, Breslau, and Erich Friedländer, Berlin-Spandau, Germany, assignors to Siemens-Schuckertwerke Aktiengesellschaft, Berlin-Siemensstadt, Germany, a corporation of Germany Application March 8, 1934, Serial No. 714,658
In Germany March 8, 1933

22 Claims. (Cl. 172—237)

Our invention relates to an arrangement for maintaining constant line power transmission in a line of an interconnected system.

The regulation of the power to be transmitted jointly by several electric power generating systems presents great difficulties. The control of the power to be transmitted may be effected in the manner that the frequency is maintained constant in one power system, whereas in the other system the power produced therein is regulated in such a manner in accordance with the power actually transmitted—for instance, by influencing any desired generator—that a more or less greater excess or shortage of the power produced in the second power system occurs as compared to the power consumed in the same system. The difference in power must then be transmitted from the first system over the line connecting the systems, in which line, for instance, a transmission of constant power is to be effected. The difficulties arising out of the regulation of the power to be transmitted lie above all in the fact that the inertia of all station machines and of the power consuming machines of both systems retard the regulating process. Consequently, if the generator power in one system is, for instance, suddenly varied by a given amount a change in frequency in both systems will at first take place with a certain velocity. The excess power produced is then first distributed over both parallel-connected systems only according to the flywheel masses of the machines of the systems. The uncertain state of distribution—in the case of the conditions frequently occurring between a small controlled and transmitted power and very large total powers of the parallel-connected systems—practically lasts many seconds before the frequency has changed to such an extent that owing to the static character of the parallel-connected machines or to the regulating means in the power station which regulates for constant frequency any other distribution of power takes place. The result is that at first an insufficient power transmission occurs and later on the power increases beyond the desirable extent.

The object of our invention is to provide an arrangement, whereby the fluctuations of power are reduced to a minimum. To this end, according to the invention, a reactor is inserted in the line connecting both power systems or power stations, the inductance of this reactor varying in accordance with the phase position of the voltage vectors. For this purpose, as will be described later in detail, a reactor with variable air gap may, for instance, be employed and its inductance may be varied in accordance with the power to be transmitted in such a manner that the power still retains approximately its prescribed value for a certain time. Thus, if, for instance, the power to be transmitted tends to increase, the inductance of the reactor is increased. Before the reactor reaches the limit of its regulating range one power station must in the meantime be, for instance, influenced in accordance with the voltage of the reactor in such a manner that the voltage vectors of both stations return to their original position of phase. Also the reactor is brought back at the same time to its original inductance. Consequently, if station 2 tends to supply too much power to station 1 the power of station 2 is reduced. In this manner the voltage vectors are again brought to their original relative position of phase and at the same time also the inductance of the reactor assumes again its original value so that for the same relative position of phase of the voltage vectors the power to be kept constant is again transmitted. By varying the inductance of the reactor it is possible that both systems may vary their relative position of phase when the power to be transmitted tends to vary so that the latter will not be affected in any appreciable manner by the relative hunting of the voltage vectors. By regulating the power of the one power system the voltage vectors return then again to their original relative position so that the same power is transmitted from the one system to the other for the same relative position of phase of the voltage vectors of the systems. The control of the magnetic resistance may be effected as above mentioned by varying the air gap; for instance by means of a rotatable armature.

To this end, the position of the armature may be, for instance, varied by measuring the power to be transmitted.

It is particularly convenient to employ a reactor premagnetized by direct current.

The invention is illustrated in the accompanying drawings, in which

Fig. 1 diagrammatically represents two power distributing systems, in which the constant line power transmission is controlled by a variable air gap impedance;

Fig. 1ᵃ represents a power distributing diagram similar to Fig. 1, showing a modified form of reactor;

Fig. 2 represents a graph, showing the characteristic of a power control reactor placed in the power line common to the several power stations;

Fig. 3 represents diagrammatically in simplified form an arrangement for maintaining the power between two parallel connected lines constant;

Fig. 4 represents a modification of Fig. 3, in which reactors are inserted in both parallel connected transmission lines;

Fig. 5 represents a diagram for keeping the power constant in a certain line of an interconnected system;

Fig. 6 represents a diagram in substance similar to Fig. 1ᵃ, but in which means are provided by which the prime mover regulating device 8 is controlled by the voltage prevailing in the direct current excitation circuit of the reactor;

Fig. 7 represents diagrammatically an arrangement in which in a system according to Fig. 1ᵃ the power of one of the two stations may be controlled in accordance with the angle formed by the voltage vectors of the two stations, and Fig. 8 represents diagrammatically an arrangement for suppressing higher harmonic currents in a direct current energized reactor.

Referring first in a preliminary way to Fig. 2, this figure shows a reactor, as aforementioned, energized by direct current. Within a certain operating range indicated in Fig. 2 by the dash lines the alternating-current voltage $\Delta U$ of the reactor varies considerably with a slightly varying alternating current F. That implies that if such a reactor is inserted in the line connecting both systems, the voltage vectors of both systems may be moved in relation to one another in an appreciable manner without the power to be transmitted being affected in a corresponding manner by the fluctuations of the phase angle between the voltage vectors. The total power produced as compared to the power consumed in the one system need then only be influenced in the same power system in such a manner that the voltage $\Delta U$ at the balancing reactor assumes a suitable mean value $\Delta U_0$ or oscillates about this value. The power to be transmitted will no longer be appreciably affected by these fluctuations.

Referring now to Fig. 1, 1 and 2 represent two power stations and their distributing net works which are coupled together by a tie-in line 16, and it is the problem to maintain the power transmitted through this tie-in line simultaneously constant. For this purpose a reactor 50 is disposed in line 16. Since it is desirable that the power transmission system 1 is to be regulated to constant frequency, a frequency regulator 5 is provided for this system which acts upon the turbine 4 which drives the generator 3. Of course, instead of having such a frequency regulator acting upon only one machine in the power station of that system it may also act upon several machines such as is indicated in this figure by the turbine 4' and the appertaining generator 3'. The regulation of the power transmitted through line 16 occurs in this modification by influencing a voltage relay 12 by the voltage $\Delta U_0$ of the reactor, as previously explained with reference to Fig. 2. If the voltage at the ends of the reactor 50 equals the normal value $\Delta U_0$, the relay 12 remains at rest, i. e. its contact arm stands in the middle between its two appertaining stationary contacts. If the voltage at the reactor ends should rise, relay 12 closes its upper contact and if the voltage drops it closes its lower contact. These contacts of relay 12 are connected in conventional manner, not shown here, to a prime mover regulating device 8 in such manner that when the upper relay contact is closed the prime mover 7 which drives generator 6 is so influenced that the output of the generator is diminished, and when the other contact of relay 12 is closed the output of generator 6 is increased. Also in this case the regulating device 8, similar to frequency regulator 5 may affect more than one prime mover and generator, such as for instance the additional prime mover 7' and generator 6'. Such additional generators may or may not be provided and affected in any of the modifications hereafter described as this is a matter obvious to any person skilled in the art.

In Fig. 1 the voltage at the ends of the reactor 50 is varied in accordance with the difference in power flowing in the two sides of line 16 in the following manner. The core 59 of reactor 50 is provided with an air gap in which an armature 51 is rotatably disposed. This armature is rotated (through suitable gearing not shown here) by means of a motor 52 which is provided with two field windings 53 and 54. 56 is a watt responsive relay which is energized by means of the current transformer 57 connected in line 16, and the voltage transformer 58 connected to line 16. This relay 56 is designed so that at the normal value of the power to be transmitted through line 16 its movable contact arm stands midway between its two appertaining stationary contacts, and when the power varies beyond or below this value the arm will correspondingly contact with one or the other of its contacts. One pole of the armature of motor 52 is connected with the junction point between the two field windings 53 and 54, and the other pole of armature 52 is connected with the movable contact arm 56ᵃ by way of a battery 55. One of the fixed contacts of relay 56 is connected with the free end of winding 54 and the other relay contact with the free end of field winding 53.

This arrangement operates in the following manner: If for instance the power transmitted through line 16 tends to rise beyond the desired value, contact arm 56ᵃ closes its upper contact. Thereby the motor field winding 54 is energized such that the motor 52 turns in a direction in which armature 51 of the reactor is turned in a direction in which the inductance of the reactor is increased (in this case clockwise) so that the current in line 16 is again reduced to the normal value. Though the phase angle between the voltage vectors of the two power transmitting systems on the two sides of reactor 50 increases, the power transmitted nevertheless remains constant by this expedient.

If in such a case nothing else were done, and if the output of system 2 were not influenced at the same time, the consequence would be that the phase angle between the two power systems would widen more and more and the reactor 50 would soon arrive at the end of its controlled range. Therefore, in order to correspondingly reduce the phase angle between the voltage vectors of the two power transmission systems means should be provided for acting upon the power output of power system 2. For this purpose as already mentioned the voltage relay 12 is provided and connected to the two ends of the reactor so that it becomes responsive to the voltage variations at the reactor ends. If the voltage supplied to this relay rises, its contact arm closes its upper contact, and in this manner influences the power regulating device 8 in such manner that the latter causes a diminishing of power output in the system 2. Thereby the angle between the two voltage vectors of the two power systems is again reduced. At the same time, owing to the diminishing of this power, relay 56 throws its arm 56ª to the other side, and thus causes motor 52 to reverse its direction of rotation and to thus decrease the inductance of the reactor by turning its armature 51 counterclockwise for a certain distance. This regulating cycle terminates as soon as the same amount of power flows again across line 16 at the normal relative voltage phase as before.

To prevent a faulty regulation from occurring upon a sudden reversal of the direction of power, a power directional relay 13 is provided which is energized through a current transformer 14 and a potential transformer 15. The connection is carried out in this case in such a manner that only the voltage relay 12 is actuated in the case of the power flowing in the proper direction.

However, if the direction of power should reverse, the relay 13 closes its lower contact and thereby influences the output of the power system 2 till the desired direction of flow of power is brought about again and the voltage relay 12 may then be again actuated. In the embodiment shown in Fig. 1 it has been assumed that the power is transmitted from the power system 2 to the power system 1. If the power is to be transmitted from the power system 1 to power system 2 the terminals are exchanged accordingly by connecting the conductor leading from the movable contact of the relay 12 with the lower stationary contact of the relay 13 as well as the conductor leading from the lower contact of the relay 13 with the upper contact of the relay 13.

By the use of a reactor premagnetized by direct current, the inductance varies automatically as soon as the power to be transmitted in the one or the other direction tends to vary. This form of reactor is shown in Fig. 1ª, in which 9 represents the reactor provided with a direct current energizing winding 10 which receives its energy from the direct current source 11. The power to be transmitted does not remain constant however owing to the inclination of the characteristic, shown in Fig. 2. To improve the arrangement the direct-current energization may be, therefore, controlled in accordance with the power to be transmitted in such a manner that the inductance varies so as to keep the power to be transmitted constant for a short time. In the first instance this change in inductance would render possible a rotation of the voltage vectors in relation to one another for an approximately constant power to be transmitted, whereupon the control device 8 would operate to bring back again the voltage vectors to their original position. Such an arrangement is embodied in Fig. 1ª. Here the energy relay 73 similar in character to relay 56 of Fig. 1 has its voltage coil 74 and its current coil 75 connected to the transmission line in the conventional manner, and controls in accordance with its response to the line energy a direct current motor 76 in a manner similar to that shown with respect to motor 52 in Fig. 1. In Fig. 1ª, however, motor 76 operates a rheostat arm 77 of a rheostat 78 located in the direct current magnetizing circuit of the reactor. As soon as the energy transmitted by the line tends to rise, resistance 78 is automatically increased, and when the energy drops the resistance is decreased. By this control the tendency of the reactor characteristic, illustrated in Fig. 2 is neutralized, because the voltage characteristic of the reactor between the dash lines in Fig. 2 is now made vertical instead of slanting. By the effect of relay 73, the characteristic of the reactor is regulated so exact, that the current remains quite constant when the voltage varies.

The capability of the premagnetized reactor of maintaining the current constant within wide limits of the voltage variation may be taken advantage of for distributing the power over parallel-connected lines. If, for instance, the power station 1, as shown in Fig. 3, is connected with the power station 2 through two different lines 20 and 21 it is often desirable to maintain constant at least on one of these lines the power to be transmitted.

This may be accomplished in a simple manner by inserting in the line 20 a reactor 9, whose direct-current winding is energized by a voltage source 11, and which is premagnetized to such an extent that it operates under normal working conditions within the operating range disclosed in Fig. 2. To maintain exactly constant the power to be transmitted, the direct-current premagnetization of the reactor may also be varied as shown in Fig. 1ª and described with reference to that figure.

Instead of this direct-current premagnetized reactor 9 another reactor may also be employed in Fig. 3, whose inductance is varied in accordance with the power to be transmitted in such a manner that the latter remains constant. For instance the reactor may be of the form shown at 50 in Fig. 1, and may be controlled in the manner shown in that figure. The direct-current premagnetized reactor presents, however, the advantage that an approximately constant flow of active power over the line 20 may also be attained without any regulating device if both power systems 1 and 2 have a constant or approximately constant voltage. For instance, in the arrangement shown in Fig. 3 it is also possible to insert, as is shown in Fig. 4, a direct-current premagnetized reactor in the line 21 and to vary the power of the system 2 in accordance with the voltage of this second reactor in such a manner, as in the case of the arrangement according to Fig. 1ª, so that the power to be transmitted in the line 21 remains constant. The active power transmitted remains then approximately constant in the line 20 without the use of any regulating device.

Fig. 5 shows another embodiment of our invention. In this case the active power in the line 31 is kept approximately constant by a reactor 9 arranged in the line 31 of an interconnected system, fed by a power station 30, it being assumed that the voltage at the ends of the line remain approximately constant.

When regulating the power to be transmitted in accordance with the voltage of the reactor, means may be also employed for preventing an overregulation. It is particularly convenient to make the relay 12 not only conditional upon the change in voltage $\Delta U - \Delta U_0$, but also upon the differential quotient of the voltage $\Delta U$ according to time. The relay is then operated in response to $$\Delta U - \Delta U_0 + k\frac{d\Delta U}{dt}$$

In this case a sudden change in the voltage simulates a greater change in voltage, while on return of the voltage to its prescribed value, the regulation had already been previously interrupted so that an overregulation is prevented.

Another embodiment of our invention for preventing the overregulation is shown in Fig. 6, similar numerals corresponding to similar parts of Fig. 1ª. In the arrangement shown in Fig. 6 the fact is taken advantage of that the direct current of the premagnetized reactor varies temporarily under the influence of the change in voltage, that is to say that the direct current increases temporarily with increasing voltage and decreases with decreasing voltage. By the insertion of suitable current relays in the direct-current circuit which selectively interrupt the control conductors leading to the regulating device 8 in the case of great changes in voltage, for instance, a regulation which reduces the voltage may be effected only so long as the voltage increases, whereas with decreasing voltage the regulation is prevented. To this end, the upper contact of the relay 12 is connected to a contact of the relay 40 reacting to a drop of current, and the lower contact of the relay 12 to a contact of the relay 41 reacting to a rise of current, the coils of the relays 40 and 41 being connected in the direct current circuit of the reactor. Under normal operation conditions the contacts of both relays 40, 41 are closed. Upon a decrease in voltage relay 40 opens its contact and upon an increase in voltage the relay 41 opens its contact. If, for instance, the power to be transmitted has the tendency to increase, the relay 12 as above described closes its upper contact, whereby the regulating device 8 is influenced in such a manner as to decrease the power in the power system 2. In this case the contact of the relay 40 is closed. However, as soon as the voltage begins to approach again its normal value the direct current is decreased and the relay opens its contact, thus preventing the regulation momentarily. In the same manner the relay 41 prevents the regulation if the voltage increases to its prescribed value. Both relays may be made conditional upon the speed with which the voltage varies, so that the signal is blocked only when the voltage approaches its prescribed value very rapidly.

Instead of regulating the power of one system or power station in accordance with the departure of the voltage of the reactor from its mean value it may be regulated in accordance with the angle formed by the voltage vectors of both systems. To this end, in a system such as is portrayed in Fig. 1ª, and represented simplified in Fig. 7, a phase angle responsive device 80 may be employed, the movable contact arm of which is in the central position for a given angle formed by both voltage vectors, whereas in the case of a greater or smaller angle the movable contact arm is brought into contact with one or the other of two stationary contacts, thereby influencing the power of the station 2 at its regulating device 8, similar to the manner in which voltage relay 12 in Fig. 1ª controls this regulating device. This phase-angle-responsive device may be constructed in the manner of a standard cos. α meter and is energized from the two sides of the controlled line by way of the two instrument transformers 81, 82. The phase angle is so chosen that the reactor operates in the middle of the regulating range as shown in Fig. 2. Since the deflection of the phase angle responsive device is not only dependent upon the magnitude but also upon the direction of the angle between both voltage vectors the use of a particular power directional relay may be dispensed with.

If the magnitude of the power transmitted is to be varied, it is only necessary to vary the direct-current premagnetization of the reactor. In this case, the current and also the power to be transmitted become greater or smaller in the case of the same voltage of the reactor or in the case of the same phase angle of both voltage vectors. In this case the adjustment of the voltage relay or the phase angle responsive device need not be modified. In cases in which the inductance of the reactor is varied by a particular regulating device in accordance with the power to be transmitted it is necessary to also adjust this device in such a manner that another value of inductance corresponds to each phase angle.

As is well-known, by the use of a direct-current premagnetized reactor harmonics occur. In order to suppress the latter resonance circuits may, for instance, be provided for the harmonics, the circuits being connected in parallel relation to the reactor. However, it is also possible to suppress the even numbered harmonics by connecting two equal reactors in series or in parallel, the direct-current windings of which are so connected that the reactors are traversed in opposite directions by the constant magnetic field. A symmetrization then takes place again so that the even numbered harmonics in the current or in the resultant voltage are suppressed. To suppress also the fifth and seventh harmonic in the case of three phase connections besides this unit consisting of two reactors a further unit consisting of two reactors also traversed by the constant magnetic field in opposite directions may be provided, the alternating-current windings of said unit may be, for instance, so connected that the latter produce fifth and seventh harmonics of the same or different sign as the first unit. To this end, the reactor of the first unit may be, for instance, star-connected and that of the second unit zig-zag-connected, the star- and zig-zag-windings being series-connected. Also other connections may be employed by means of which it is possible to displace the alternating-current flux in both units 30°. The arrangement may be simplified by providing a common iron core for all reactors.

Such an arrangement is shown in Fig. 8. In this figure 90 constitutes a twelve-shank iron core. In the upper group of shanks the windings 91 of the first reactor coil are disposed on the first, third and fifth shank from the left, while the windings 92 of the second reactor coil are carried by the second, fourth and sixth shank. In the lower group of shanks the windings 93 of the third reactor coil are disposed on the first, third and fifth shank, while the windings 94 of the fourth reactor coil are disposed on the second, fourth and sixth shank. The windings of the lower reactor coil are connected in zig-zag and in such manner that the fluxes of two superposed shanks of the entire reactor are transposed by thirty electrical degrees with relation to one another. If the magnetizing effect of all reactor coils is equal, the fifth and seventh harmonics of each pair of reactor coils, whose fluxes are transposed by thirty degrees will neutralize one another. The direct current windings 96 are arranged so that in each two adjacent shanks the direct current fluxes have opposite direction and thereby the even higher harmonics in the adjacent reactor coils are neutralized.

We claim as our invention:

1. In an alternating current transmission system the combination with a power transmission line of said system, of a reactor connected in series with said line and having means, responsive to the variation in power flowing in the line from a desired normal value for varying the inductance of said reactor to vary the power carried in the line, so as to maintain the transmitted line power at a substantially constant value.

2. In an alternating current transmission system the combination with a power transmission line of said system, of a reactor connected in series with said line and having means, responsive to the variation in power flowing in the line from a desired normal value for varying the voltage at the ends of the reactor in accordance with the relative phase variation of the line voltage vectors in the two sides of the line, and means responsive to the reactor voltage variations for varying the power carried in the line, so as to maintain the transmitted line power at a substantially constant value.

3. In an alternating current transmission system the combination with a power transmission line of said system, of a reactor having an alternating current winding connected in series with said line, and a direct current winding and a direct current source for energizing said latter winding, means for varying the direct current excitation in accordance with the variation of the power transmitted through the line, to vary the voltage at the ends of said alternating winding, and means responsive to said voltage variation for varying the power flowing in the line at one side of the reactor, so as to maintain the power transmitted through the entire line at a substantially constant value.

4. In an alternating current transmission system the combination with two power generating systems and a transmission line connecting said systems, of a reactor connected in series with said line and having means responsive to the variation in power from a desired value transmitted through the line, for varying the inductance of said reactor from its normal value to maintain the power transmitted through said line substantially constant, and means connected to said reactor and being responsive to its inductance variations for controlling the power output of one of said generating systems to restore the reactor inductance to its normal value.

5. In an alternating current transmission system the combination with two power generating systems and a transmission line connecting said systems, of a reactor having an alternating current winding connected in series with said line and a direct current winding and a direct current source for energizing said latter winding, said reactor having means, responsive to the variation in power from a desired value transmitted through the line, for varying said direct current excitation to vary the inductance of said reactor from its normal value, to restore the power transmitted through said line substantially to its normal value, and means connected to said alternating current reactor winding and being responsive to the voltage variations at the winding ends due to the reactor inductance variation, for controlling the power output of one of said generating systems, to restore the reactor voltage to its normal value.

6. In an alternating current transmission system the combination with two power generating systems and a transmission line connecting said systems, of a reactor connected in series with said line and having means responsive to the variation in power from a desired value transmitted through the line, for varying the inductance of said reactor from its normal value to maintain the power transmitted through said line substantially constant, and a voltage relay connected to said reactor and having means responsive to the voltage variations in said reactor due to its inductance variation, and having two contact positions and a neutral position corresponding respectively to its response to excess, sub-normal and normal reactor voltages, and power output control means for one of said generating systems, connected to said voltage relay and controllable by said relay to vary the output of said generating system in accordance with the reactor voltage variations, to restore the reactor voltage to its normal value.

7. In an alternating current transmission system the combination with two power generating systems and a transmission line connecting said systems, of a reactor connected in series with said line and having means responsive to the variation in power from a desired value transmitted through the line, for varying the inductance of said reactor from its normal value to maintain the power transmitted through said line substantially constant, and a relay responsive to the voltage vector phase angle and being connected to the two sides of the line adjacent to said reactor to respond to the phase angle between the voltage vectors at the ends of the reactor, said relay having two operating contact positions corresponding to excess and sub-normal values of said angle, and having a neutral position corresponding to the desired value of said angle, and a power output control means for one of said generating systems, connected to said relay and actuated by the closing of one or the other of said contacts to vary the output of said generating system, to restore the voltage vector angle to its desired normal value.

8. In an alternating current transmission system the combination with two power generating systems and a transmission line connecting said systems, of a reactor connected in series with said line and having means responsive to the variation in power from a desired value transmitted through the line, for varying the inductance of said reactor from its normal value to maintain the power transmitted through said line substantially constant, and a voltage relay connected to said reactor and having means responsive to the voltage variations in said reactor due to its inductance variation, and having two contact positions and a neutral position corresponding respectively to its response to excess, sub-normal and normal reactor voltages, and power output control means for one of said generating systems, connected to said voltage relay and controllable by said relay to vary the output of said generating system in accordance with the reactor voltage variations, to restore the reactor voltage to its normal value, and a power-flow-direction-responsive relay connected into said line and having operating contacts closed in accordance with the flow of the line power in one or the other direction and connected to said power output control means to vary the output of said generating system in case of undesired reversal of power flow in said line, to restore the normal direction of line power flow.

9. In an alternating current transmission system the combination with two power generating systems and a transmission line connecting said systems, of a reactor having an alternating current winding connected in series with said line and a direct current winding and a direct current source for energizing said latter winding, said reactor having means, responsive to the variation in power from a desired value transmitted through the line, for varying said direct current excitation to vary the inductance of said reactor from its normal value, to restore the power transmitted through said line substantially to its normal value, and means connected to said alternating current reactor winding and being responsive to the voltage variations at the winding ends due to the reactor inductance variation, a power output control means for one of said generating systems actuated by said voltage variation responsive means, for varying the power output of said system to restore the reactor voltage to its normal value, and a maximum and a minimum current relay inserted in series with said direct current winding, said relays each having a contact, closed at the normal direct current flow through said winding, and having said contacts in circuit with said power output control means and said voltage responsive means, whereby the maximum current relay opens its contact at an excessive rise of the direct current, and the minimum current relay opens its contact at an excessive drop of the direct current, for preventing the over-regulation of said generating system by its power output control means.

10. In an alternating current transmission system the combination with two power generating systems and two transmission lines connecting said systems, of means for maintaining the power flow in at least one of said lines at a desired constant value, comprising a reactor connected in series with said line and having means responsive to the variation in line power from the desired normal value, for varying the inductance of said reactor to vary the power caused in the line, so as to restore the transmitted line power substantially to its normal value.

11. In an alternating current transmission system the combination with two power generating systems and two transmission lines connecting said systems, of means for maintaining the power flow in at least one of said lines at a desired constant value, comprising a reactor connected in series with said line and having a direct current excitation winding and a direct current source for energizing said winding, and means connected to said line and being responsive to the variation in line power from the desired value, for varying the direct current energization of said winding, to vary the inductance of said reactor, for the purpose of varying the power carried in said line, so as to restore the transmitted line power substantially to its normal value.

12. In an alternating current transmission system the combination with two power generating systems and two transmission lines connecting said systems, of means for maintaining the power flow in each of said lines at a desired constant value, comprising a reactor for each line connected in series with the line and having each a direct current excitation winding and a direct current source for energizing said winding and means connected to its appertaining line responsive to the variation in line power from the desired value, for varying the direct current energization of the reactor winding to vary the reactor inductance for the purpose of varying the power carried in said line, so as to restore the transmitted line power substantially to its normal value, and means responsive to the reactor voltage variations in one of said transmission lines, for varying the power output of one of said generating systems, to restore the voltages at the two reactors to their normal values prevailing at the normal power transmission.

13. In an alternating current transmission system, the combination with a power transmission line for said system of means for maintaining the transmitted line power constant, including a reactor coil having two windings, one connected in series with said line, and a direct current source for suitably energizing the other winding for automatically producing a reactor inductance variation in accordance with the line power variation.

14. In an alternating current transmission system, including several power stations, the combination with a transmission line connecting said stations, of means for maintaining the transmitted line power constant, including a reactor coil having two windings, one connected in series with said line and a direct current source for suitably energizing the other winding for automatically producing a reactor inductance variation in accordance with the line power variation, and means for controlling the power output of one of said stations to maintain the voltage at the ends of said alternating reactor winding substantially constant.

15. In an alternating current transmission system, including several power stations, the combination with a transmission line connecting said stations, of means for maintaining the transmitted line power constant, including a reactor coil having two windings, one connected in series with said line, and a direct current source for suitably energizing the other winding for automatically producing a reactor inductance variation in accordance with the line power variation, and a relay having a neutral middle position and two actuating positions, and having a winding connected to the ends of the reactor alternating current winding, and being adjusted to remain in neutral position at the desired mean reactor alternating current voltage, and to assume the two actuating positions when the reactor voltage varies respectively above or below said mean voltage, and means for varying the output of one of said stations in accordance with the position assumed by said relay for restoring the desired mean reactor voltage.

16. In an alternating current transmission system, including several power stations, the combination with a transmission line connecting said stations, of means for maintaining the transmitted line power constant, including a reactor coil having two windings, one connected in series with said line, and a direct current source for suitably energizing the other winding for automatically producing a reactor inductance variation in accordance with the line power variation, and a relay responsive to the voltage vector phase angle and being connected to the two sides of the line adjacent to said reactor to respond to the phase angle between the voltage vectors at the ends of the reactor, said relay having two operating contact positions corresponding to excess and sub-normal values of said angle, and having a neutral position corresponding to the desired value of said angle, and a power output control means for one of said generating systems, connected to said relay and actuated by the closing of one or the other of said contacts to vary the output of said generating system, to restore the voltage vector angle to its desired normal value.

17. In an alternating current transmission system, including several power stations, the combination with a transmission line connecting said stations, of means for maintaining the transmitted line power constant, including a reactor coil having two windings, one connected in series with said line, and a direct current source for suitably energizing the other winding for automatically producing a reactor inductance variation in accordance with the line power variation, and a relay having a neutral middle position and two actuating positions, and having a winding connected to the ends of the reactor alternating current winding, and being adjusted to remain in neutral position at the desired mean reactor alternating current voltage, and to assume the two actuating positions when the reactor voltage varies respectively above or below said mean voltage, and means for varying the output of one of said stations in accordance with the position assumed by said relay for restoring the desired mean reactor voltage, and a power-flow-direction-responsive relay connected into said line, and having operating contacts closed in accordance with the direction of the line power flow, and being connected to said power output control means to vary the output of said power station in case of undesired reversal of power flow in said line to restore the desired direction of line power flow.

18. In an alternating current transmission system, including several power stations, the combination with a transmission line connecting said stations, of means for maintaining the transmitted line power constant, including a reactor coil having two windings, one connected in series with said line, and a direct current source for suitably energizing the other winding for automatically producing a reactor inductance variation in accordance with the line power variation, and a relay having a neutral middle position and two actuating positions depending upon the sum of the alternating current voltage and the first differential quotient of the voltage at the reactor coil, said relay being adjusted to remain in neutral position at the desired voltage value and to assume one or the other actuating position on deviation of said value in one or the other direction, and means for varying the output of one of said power stations in accordance with the positions assumed by said relay to restore the desired voltage value.

19. In an alternating current transmission system, including several power stations, the combination with a transmission line connecting said stations, of means for maintaining the transmitted line power constant, including a reactor coil having two windings, one connected in series with said line, and a direct current source for suitably energizing the other winding for automatically producing a reactor inductance variation in accordance with the line power variation, and a relay having a neutral middle position and two actuating positions depending upon the sum of the alternating current voltage and the first differential quotient of the voltage at the reactor coil, said relay being adjusted to remain in neutral position at the desired voltage value and to assume one or the other actuating position on deviation of said value in one or the other direction, and means for varying the output of one of said power stations in accordance with the positions assumed by said relay to restore the desired voltage value, and a power-flow-direction-responsive relay connected into said line, and having operating contacts closed in accordance with the direction of the line power flow, and being connected to said power output control means to vary the output of said power station in case of undesired reversal of power flow in said line to restore the desired direction of line power flow.

20. In an alternating current transmission system including several power stations, the combination with a power transmission line connecting said stations, of means for maintaining the transmitted line power constant, consisting of a reactor coil having two windings, one connected in series with said line, and a direct current source for suitably energizing the other winding, for automatically producing a reactor inductance variation in accordance with the line power variation, and a relay having a neutral middle position and two actuating positions, and having a winding connected to the ends of the reactor alternating current winding and being adjusted to remain in neutral position at the desired mean reactor alternating current voltage, and to assume the two actuating positions when the reactor voltage varies respectively above or below said mean voltage, and means for varying the output of one of said stations in accordance with the position assumed by said relay for restoring the desired mean reactor voltage, and a maximum and a minimum relay in circuit with said direct current reactor coil, each relay arranged to interrupt the direct current supply when the direct current through said reactor coil momentarily rises or drops respectively, and means connected with said relays for controlling the output of said one station in accordance with the response of said relays, for preventing over-regulation of the station.

21. In an alternating current transmission system, the combination with two power generating stations, and two transmission lines connecting said stations, of means for maintaining the power flow in at least one of said lines at a desired constant value, including a reactor having two windings, one connected in series with said line, and a direct current source for suitably energizing the other winding for automatically producing a reactor inductance variation in accordance with the line power variation.

22. In an alternating current transmission system, the combination with two power generating stations, and two transmission lines connecting said stations, of means for maintaining the power flow in both of said lines at a desired constant value, including a reactor in each line, each reactor having an alternating current winding connected in series with its appertaining line, and a direct current winding and means for supplying direct current to said latter windings, and means, responsive to the inductance variations in one of said reactors due to line power variation, for controlling one of said power stations for maintaining the alternating current voltage at both of said reactors constant.

WILHELM WISKOTT.
ERICH FRIEDLÄNDER.